United States Patent
Ohira et al.

(10) Patent No.: US 7,690,762 B2
(45) Date of Patent: Apr. 6, 2010

(54) WATER BASE INK FOR INK-JET RECORDING

(75) Inventors: Hideo Ohira, Tajimi (JP); Hiromitsu Sago, Tokai (JP); Kazuma Goto, Nagoya (JP); Narumi Koga, Nagoya (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 477 days.

(21) Appl. No.: 11/414,723

(22) Filed: Apr. 28, 2006

(65) Prior Publication Data

US 2006/0192828 A1    Aug. 31, 2006

(51) Int. Cl.
B41J 2/16    (2006.01)

(52) U.S. Cl. .............................. 347/44; 347/85; 347/30; 347/29; 347/86; 347/100

(58) Field of Classification Search .................... 347/86, 347/100, 85, 29, 30
See application file for complete search history.

(56) References Cited

U.S. PATENT DOCUMENTS

| | | | |
|---|---|---|---|
| 4,279,653 A | 7/1981 | Makishima et al. | |
| 4,948,427 A | 8/1990 | Yamagishi et al. | |
| 5,665,151 A | 9/1997 | Escano et al. | |
| 6,120,126 A | 9/2000 | Nakahara | |
| 6,227,662 B1 | 5/2001 | Takata | |
| 6,244,684 B1 | 6/2001 | Kokai et al. | |
| 6,315,402 B1 | 11/2001 | Kawase | |
| 6,585,362 B2 * | 7/2003 | Blease et al. | 347/92 |
| 6,726,754 B2 | 4/2004 | Lye et al. | |
| 6,733,113 B2 | 5/2004 | Yoshizawa et al. | |
| 2001/0024226 A1 * | 9/2001 | Sasaki | 347/86 |
| 2002/0021327 A1 * | 2/2002 | Ingham et al. | 347/44 |
| 2002/0175976 A1 * | 11/2002 | Okuda | 347/71 |
| 2003/0151645 A1 * | 8/2003 | Yamada et al. | 347/47 |

FOREIGN PATENT DOCUMENTS

| | | |
|---|---|---|
| JP | 52-074406 | 6/1977 |
| JP | 4-147865 | 5/1992 |
| JP | 10-60339 | 3/1998 |
| JP | 10-250113 | 9/1998 |
| JP | 11-58760 | 3/1999 |
| JP | 11-99660 | 4/1999 |
| JP | 11-263028 | 9/1999 |
| JP | 2000-141687 | 5/2000 |
| JP | 2001-254033 | 9/2001 |

* cited by examiner

*Primary Examiner*—Manish S Shah
*Assistant Examiner*—Laura E Martin
(74) *Attorney, Agent, or Firm*—Reed Smith LLP

(57) ABSTRACT

A water base ink for ink-jet recording is provided, which makes it possible to secure a high recording quality with a sharp image area edge by avoiding any blurring even when recording is performed on regular paper and which has satisfactory purge restoration performance. Therefore, no bubble remains in an ink flow passage, and no discharge failure is caused. Further, the discharge operation never becomes unstable. In the water base ink for ink-jet recording, the surface tension is not less than 40 mN/m, and the amount of dissolved oxygen is not more than 4 mg/L.

4 Claims, 8 Drawing Sheets

WATER BASE INK FOR INK-JET RECORDING

The present application claims priority from U.S. patent application Ser. No. 10/645,197, filed on Aug. 21, 2003, now U.S. Pat. No. 7,247,192, which claims priority from Japanese Patent Application No. JP 2002-242412, filed on Aug. 22, 2002, the disclosure of which is incorporated herein by reference in its entirety.

BACKGROUND OF THE INVENTION

1. Field of the Invention

The present invention relates to a water base ink for ink-jet recording which has satisfactory purge restoration performance while securing a high recording quality with a sharp image area edge, a method for producing the same, and an ink-jet recording apparatus which is provided with the ink.

2. Description of the Related Art

In the ink-jet recording system, ink droplets are formed by means of the ink discharge method including, for example, the electrostatic attraction method, the method in which mechanical vibration or displacement is applied to the ink by using a piezoelectric element, and the method in which bubbles are generated by heating the ink to utilize the pressure generated thereby. All or a part of the ink droplets are adhered to a recording objective material such as paper to perform the recording.

Those having been hitherto developed as the ink for ink-jet recording to be used for the ink-jet recording method as described above include the oil base ink which uses an organic solvent as a solvent and the water base ink which uses water as a main solvent. However, in recent years, the development is dominantly directed to the water base ink in consideration of the safety and the environment.

When the recording is performed with an ink-jet printer by using a general water base ink, any exclusive ink-jet paper is sometimes used in order to obtain a satisfactory printing quality without any blurring of the ink. However, in recent years, it is more demanded that the recording is performed on the regular paper rather than on the exclusive ink-jet paper, in consideration of the running cost and the environment.

When the recording is performed on the regular paper, a problem arises such that the recording quality is extremely deteriorated as compared with the case in which the recording is performed on the exclusive ink-jet paper. That is, the following problem arises. The edge of the image area is notched due to the phenomenon generally called "blurring" in which the ink is spread along the surface of the paper when the ink is permeated into the paper. As a result, it is impossible to obtain any sharp edge of the image area. For this reason, a method is generally used, in which the blurring is suppressed to obtain a sharp image area edge by making the surface tension of the ink to be not less than 40 mN/m.

On the other hand, as shown in FIG. 1, an ink-jet recording apparatus has four recording heads 101 which are mutually aligned and arranged on a holder 104 disposed on a carriage 103. Respective ink cartridges 102 of four colors are detachably installed to the holder 104 corresponding to the four recording heads 101. The carriage 103 is slidably supported by guide rails 107, 108 so that the carriage 103 is movable in the widthwise direction of recording paper 105 in a state in which the respective recording heads 101 are opposed to the recording paper 105. The carriage 103 is reciprocatively moved in the foregoing direction by a belt 112 which is stretched between a pulley 111 and a pulley 110 that is driven by a motor 109. The recording paper 105 is transported by a transport roller 106 in a direction perpendicular to the direction of the movement of the carriage. The respective recording heads 101 discharge ink droplets toward the recording paper at positions opposed to the recording paper 105 to perform the recording. A restoring unit 113 is provided at a position at which the restoring unit 113 is opposed to the recording head 101 when the carriage 103 is moved to a position outside of the recording paper 105. As disclosed, for example, in Japanese Patent Application Laid-open No. 10-250113, the restoring unit 113 comprises a suction cap 114 which is capable of making contact with the nozzle surface of the recording head 101, and a suction pump 115 which sucks the ink contained in the recording head through the suction cap 114. The suction cap 114 is moved in the direction to make approach or separation with respect to the recording head 101 by a cam 116, and the suction pump 115 is driven to effect the suction. The restoring unit performs the so-called purge operation in which the suction cap 114 is brought into contact with the nozzle surface of the recording head 101 to suck the ink contained in the recording head when the ink cartridge 102 is exchanged to introduce a new ink into the ink flow passage in the recording head or when any dust or the like adhered to the inside of the nozzle of the recording head or the viscosity of the ink is increased resulting in the necessity to remove such matters. The sucked ink is discharged to a drain ink tank 117. Storing caps 118 are provided at positions opposed to the four recording heads 101 when the carriage 103 is further moved to the outside of the restoring unit 113. The storing caps 118 cover the nozzle surfaces of the four recording heads 101 to avoid any drying of the inks contained in the nozzles of the recording heads when the recording operation is not performed. When the purge operation is performed by effecting the suction from the side of the head nozzle by using the restoring unit as described above, any turbulent flow occurs, because the ink is allowed to flow at a high speed through the ink flow passage. Consequently, bubbles are generated from gas components which have been dissolved in the ink. Bubbles also enter the ink flow passage by contaminating the ink flow passage with the air coming through the connecting portion between the ink cartridge and the head unit when the ink cartridge is exchanged. When the bubbles contained in the ink adhere to the wall surface of the ink flow passage and the bubbles remain, then the ink is not discharged from the ink-jet nozzle and/or the discharge operation becomes unstable. As a result, the recording quality is extremely deteriorated.

In view of the above, in order to discharge the bubbles from the ink flow passage, a method is used, in which the wettability between the ink and the wall surface of the ink flow passage is sufficiently improved by sufficiently lowering the surface tension of the ink to be less than 40 mN/m. When the wettability between the ink and the wall surface of the ink flow passage is sufficiently improved, then the ink promptly enters the interstices between the wall surface of the ink flow passage and the bubbles, and the bubbles are exfoliated from the wall surface of the ink flow passage so that the bubbles are discharged together with the ink, even when the bubbles inflow into the ink flow passage or when the bubbles are generated in the ink flow passage. Therefore, the bubbles scarcely remain on the wall surface of the ink flow passage. In other words, it is considered that the force, which is exerted to effect the exfoliation in this case, is larger than the force of the bubbles to adhere to the wall surface.

It is noted that the ink, in which the surface tension is not less than 40 mN/m in order to suppress the blurring on the recording medium and obtain the sharp image area edge, is inferior in wettability between the ink and the wall surface of the ink flow passage. Even when the purge operation is performed in order to discharge the bubbles from the ink flow passage, then the bubbles are not exfoliated while adhering to the wall surface of the ink flow passage and the bubbles are hardly discharged, because it is difficult for the ink to enter the interstices between the wall surface of the ink flow passage and the bubbles, probably for the following reason. That is, in this case, it is considered that the force, which is exerted to effect the exfoliation, is smaller than the force of the bubbles to effect the adhesion.

That is, when the surface tension of the ink is increased in order to obtain the sharp image area edge, the purge restoration performance is deteriorated. On the other hand, when the surface tension of the ink is lowered in order to improve the purge restoration performance, the sharp image area edge is not obtained. Therefore, the following problem has arisen. That is, it is extremely difficult to satisfy both of the sharp image area edge and the satisfactory purge restoration performance.

SUMMARY OF THE INVENTION

The present invention has been made in order to solve the problem as described above, an object of which is to provide a water base ink for ink-jet recording which has satisfactory purge restoration performance while securing a high recording quality with a sharp image area edge, a method for producing the same, and an ink-jet recording apparatus which is provided with the ink.

According to a first aspect of the present invention, there is provided an ink for ink-jet recording comprising water; and a coloring agent; wherein a surface tension of the ink is not less than 40 mN/m, and an amount of dissolved oxygen in the ink is not more than 4 mg/L. The amount of dissolved oxygen contained in the ink may be not more than 2.5 mg/L. The ink may be accommodated in a container which shuts out or shuts off oxygen.

According to a second aspect of the present invention, there is provided a method for producing an ink for ink-jet recording comprising water and a coloring agent wherein a surface tension of the ink is not less than 40 mN/m; the method comprising preparing the ink; and applying a deoxidation treatment to the prepared ink so that an amount of dissolved oxygen contained in the ink is not more than 4 mg/L. The deoxidation treatment may be performed by introducing an inert gas into the prepared ink. The prepared ink may be subjected to the deoxidation treatment so that the amount of dissolved oxygen contained in the ink is not more than 2.5 mg/L.

According to a third aspect of the present invention, there is provided an ink-jet recording apparatus comprising a recording head which discharges an ink onto a recording medium to perform recording; a restoring unit which includes a suction cap for detachably covering a nozzle surface of the recording head, and a suction pump for sucking the ink contained in the recording head through the suction cap; and an ink container which accommodates the ink to be supplied to the recording head; wherein a surface tension of the ink is not less than 40 mN/m, and an amount of dissolved oxygen contained in the ink is not more than 4 mg/L.

The recording head of the ink-jet recording apparatus may be formed by stacking a plurality of thin plates with an adhesive. In the case of the recording head of this type, the surface of the ink flow passage communicating with the nozzle is coated with the adhesive. The wettability of the ink of the present invention with respect to the adhesive is satisfactory. The adhesive may be an epoxy resin. The ink container may be a replaceable ink cartridge or an ink tank fixed to the recording apparatus. The ink cartridge may be installed to the recording head. Alternatively, the ink cartridge may be detachably attached to the main recording apparatus body, and the cartridge and the recording head may be communicated with each other via an ink supply tube.

DESCRIPTION OF THE PREFERRED EMBODIMENTS

Figure 1:
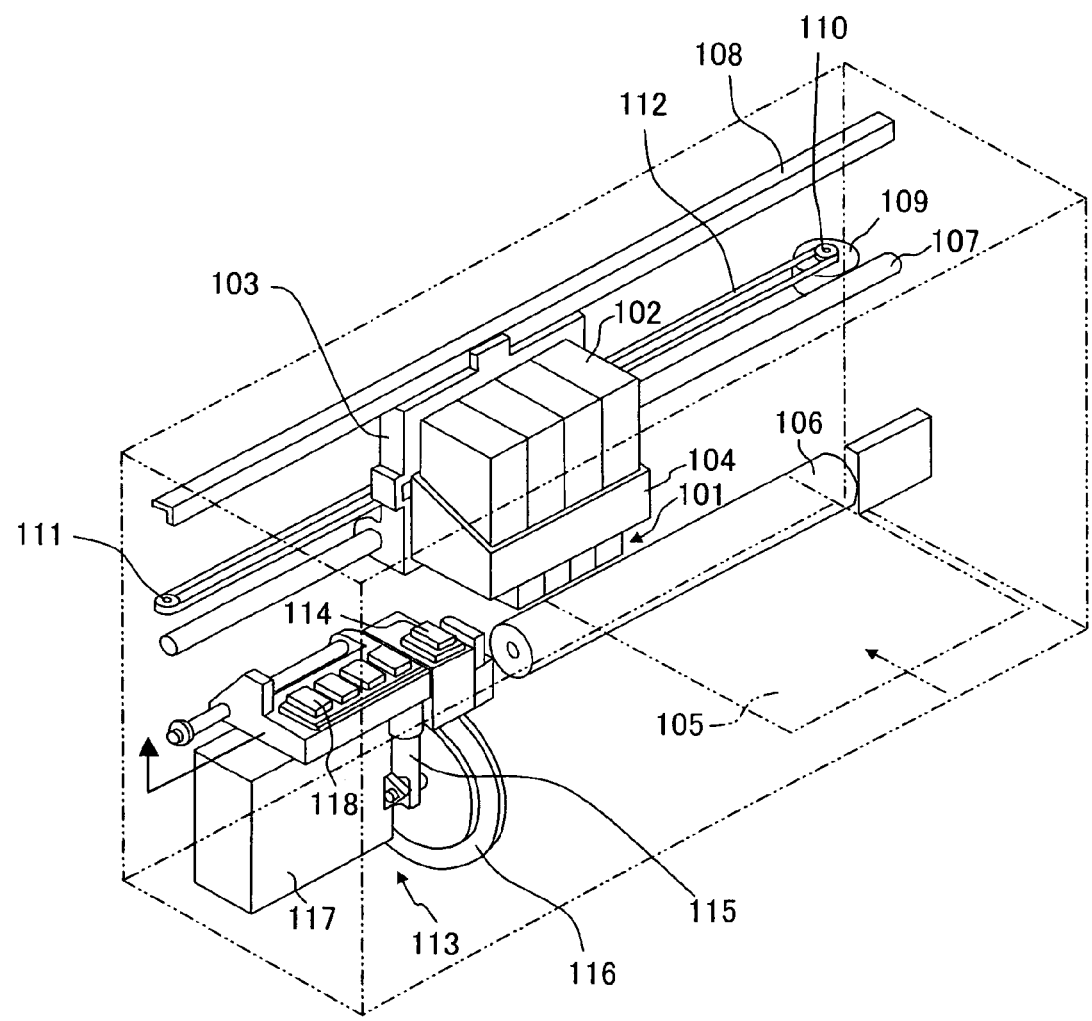
FIG. 1 shows a perspective view illustrating an ink-jet recording apparatus.

In the water base ink for ink-jet recording of the present invention, the surface tension is not less than 40 mN/m. Owing to the surface tension which is not less than 40 mN/m, it is possible to obtain a sharp image area edge by suppressing the blurring. Further, the surface tension of the ink is relatively high, and hence it is possible to obtain a high density of the image area. It is possible to obtain a high contrast between the image area and the non-image area. On the other hand, the ink, in which the surface tension is not less than 40 mN/m, has had the following problem. That is, the wettability is generally unsatisfactory with respect to the wall surface of the ink flow passage, and the ink hardly enters the interstices between the bubbles and the wall surface of the ink flow passage. In other words, the bubbles are hardly exfoliated.

The present inventors have found out the fact that the satisfactory purge restoration performance is successfully obtained even when the surface tension is not less than 40 mN/m, by allowing the amount of dissolved oxygen contained in the water base ink for ink-jet recording of the present invention to be not more than 4 mg/L. When the amount of dissolved oxygen is not more than 4 mg/L, then the oxygen concentration in the bubbles generated when the ink is subjected to the pressure reduction, for example, in the purge operation is low, and the force of the bubbles to adhere to the wall surface of the ink flow passage is weak. On the other hand, if the amount of dissolved oxygen exceeds 4 mg/L, then the oxygen concentration in the bubbles generated when the ink is subjected to the pressure reduction is high, and the bubbles strongly adhere to the wall surface of the ink flow passage. Therefore, the bubbles can be scarcely exfoliated and discharged even when the purge operation is performed. As a result, the purge restoration performance is deteriorated, probably for the following reason. That is, it is considered that the oxygen contained in the bubbles strongly adheres so that the oxygen intends to react with the wall surface of the ink flow passage when the bubbles containing the oxygen make contact with the wall surface of the ink flow passage, because the oxygen is a biradical as well and the oxygen is extremely active. In the conventional technique, no operation has been performed especially in order to manage the amount of dissolved oxygen and decrease the amount of dissolved oxygen, in which the amount of dissolved oxygen in the ink is not less than 4.5 mg/L, and the bubbles having high oxygen concentrations are generated by the purge operation. In the conventional technique, it has been impossible to obtain any satisfactory purge restoration performance. Further, in order to satisfy the purge restoration performance while the amount of dissolved oxygen is not less than 4.5 mg/L, the wettability has been improved by allowing the surface tension to be less than 40 mN/m while sacrificing the sharp image area edge on the recording medium, in view of the following fact. That is, the components of the atmospheric air are 78% nitrogen, 21% oxygen, and 1% others. The solubility in water of nitrogen is 0.00066 mol/kg, and the solubility in water of oxygen is 0.00127 mol/kg. Therefore, almost all of the gas components dissolved in the ink are nitrogen and oxygen. The extremely active oxygen is inevitably contained in the bubbles generated from the ink, together with the inert nitrogen.

It has been found out by the present inventors that the purge restoration performance is deteriorated when the ink having the high surface tension is used, especially in the case of a recording head in which the ink flow passage is coated with an adhesive. Recently, the head is formed by stacking or laminating alloy thin plates composed of nickel or the like by the aid of the adhesive. The adhesive is exposed to the wall surface of the ink flow passages including the pressure chamber and the manifold comparted in the stack. The wettability between the ink and the adhesive, especially the resin adhesive such as those composed of epoxy resin or the like is low as compared with the wettability between the ink and the metal. For this reason, the bubbles have been hitherto strongly adhered to the ink flow passage. The ink of the present invention is preferred especially for the recording head having the stacked structure composed of the adhesive and the thin plates as described above.

There is no special limitation to the method for decreasing the amount of dissolved oxygen contained in the ink to be not more than 4 mg/L. The method may include, for example, the ultrasonic deoxidation method, the vacuum deoxidation method, the deoxidation method based on the use of a gas-permeable film, the heating deoxidation method, the absorptive deoxidation method based on the use of an oxygen-absorbing agent, and the substitution method for effecting the substitution with any gas other than oxygen. In particular, the vacuum thin film deoxidation method, which is a kind of the vacuum deoxidation method and in which the ink is allowed to have a thin film shape in vacuum, makes it possible to efficiently remove the oxygen contained in the ink. The method for decreasing the amount of dissolved oxygen as described above may be used singly. Alternatively, two or more of the methods as described above may be used in combination. An inert gas can be used as the gas other than oxygen to be used for the substitution method. It is preferable to use nitrogen or rare gas such as helium, neon, argon, and krypton. When the method for decreasing the amount of dissolved oxygen as described above is carried out, the amount of dissolved oxygen contained in the ink can be decreased to be not more than 2.5 mg/L, for example, about 0.5 to 2.5 mg/L. The method for measuring the amount of dissolved oxygen is not specifically limited. It is possible to perform the measurement by using, for example, DO METER OM-14 (produced by HORIBA, Ltd.).

The water base ink for ink-jet recording of the present invention contains water as the solvent. As for the water, it is preferable to use water having a high purity including, for example, ion exchange water, distilled water, pure water, and ultrapure water.

There is no special limitation to the water base ink for ink-jet recording of the present invention provided that the surface tension is not less than 40 mN/m and the amount of dissolved oxygen is not more than 4 mg/L. The water base ink for ink-jet recording of the present invention contains, for example, a surfactant, a coloring agent, a water-soluble organic solvent, and a permeating agent, in addition to the water as described above.

The surfactant is used in order that the surface tension of the ink for ink-jet recording of the present invention is adjusted to enhance the wettability with respect to the wall surface of the ink flow passage disposed in the head. The surfactant is not specifically limited. The surfactant may include, for example, anionic surfactants such as EMAL, LATEMUL, LEVENOL, NEOPELEX, ELECTRO STRIPPER, NS SAOP, KS SAOP, OS SAOP, PELEX, and AMPHITOL SERIES (produced by Kao Corporation), and LIPOLAN, K LIPOLAN, LIPON, SUNNOL, LIPOTAC TE, ENAGICOL, LIPAL, LIONOL, and LOTAT SERIES (produced by Lion Corporation); cationic surfactants such as QUARTAMIN and SANISOL SERIES (produced by Kao Corporation), and ARQUAD, ETHOQUAD, ARMAC, and DUOMEEN SERIES (produced by Lion Corporation); non-ionic surfactants such as EMULGEN, RHEODOL, RHEODOL SUPER, EMASOL, EMASOL SUPER, EXCEL, EMANON, AMIET, and AMINON SERIES (produced by Kao Corporation), and DOBANOX, LEOCOL, LEOX, LAOL, LEOCON, LIONOL, CADENAX, LIONON, LEOFAT, ETHOFAT, ETHOMEEN, ETHODUOMEEN, ETHOMID, and AROMOX (produced by Lion Corporation); and amphoteric surfactants such as AMPHITOL SERIES (produced by Kao Corporation) and LIPOMIN, ENAGICOL, and AMPHOLAK SERIES (produced by Lion Corporation). The surfactant as described above may be used singly. Alternatively, two or more of the surfactants as described above may be used in combination. The blending amount of the surfactant is determined depending on the surface tension of the ink for ink-jet recording of the present invention. The blending amount is determined in consideration of the influence exerted by the blending of the dispersing agent, because the surface tension is changed in some cases when the dispersing agent is blended.

The coloring agent is not specifically limited. The coloring agent may include, for example, pigments and dyes. Each of the pigments and the dyes may be used singly. Alternatively, combinations of two or more of the pigments, combinations of two or more of the dyes, or combinations of two or more of the pigments and the dyes may be also available. The pigment is not specifically limited provided that the pigment is dispersible in the aqueous phase. It is possible to use, for example, any one of inorganic pigments and organic pigments. The inorganic pigment is not specifically limited, which may include, for example, carbon black, titanium oxide, and iron oxide. The organic pigment is not specifically limited, which may include, for example, azo dyes such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as basic dye type lake and acidic dye type lake; nitro pigments, nitroso pigments, and aniline black daylight fluorescent pigments. Further, it is also possible to use those obtained by surfacetreating the pigments as described above with surfactants and/or high molecular weight dispersing agents. There may be exemplified, for example, graft carbon.

In particular, when the water base ink for ink-jet recording of the present invention is a black ink, carbon black is the most general pigment. Those preferably usable include, for example, carbon black which is added with water-dispersing property with a dispersing agent such as a surfactant, and self-dispersing type carbon black which is added with water-dispersing property by applying a chemical treatment so that the surface is composed of, for example, carboxylated group and/or sulfonated functional group. The carbon black is not specifically limited, which may include, for example, furnace black, lamp black, acetylene black, and channel black. Those commercially available and preferably usable may include, for example, No. 25, No. 33, No. 40, No. 47, No. 52, No. 900, No. 2300, MCF-88, MA 600, MA 7, MA 8, and MA 100 (produced by Mitsubishi Chemical Corporation); Color Black FW1, Color Black FW2, Color Black FW2V, Color Black FW18, Color Black FW200, Color Black S150, Color Black S160, Color Black S170, Printex 35, Printex 150T, Printex U, Printex V, Printex 140U, Printex 140V, Special Black 6, Special Black 5, Special Black 4A, and Special Black 4 (produced by Degussa); Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (produced by Columbia); and Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan, CAB-O-JET 300 Black, and CAB-O-JET 200 Black (produced by Cabot).

The dye is not specifically limited, which may be exemplified by water-soluble dyes including, for example, direct dyes, acid dyes, basic dyes, and reactive dyes. In particular, those which satisfy the performance including, for example, vividness, water solubility, stability, and light resistance and which are especially preferred for the water base ink for ink-jet recording may include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; C. I. Food Black 1, 2; and C. I. Reactive Red 180.

The blending amount of the pigment and the dye is generally 0.1 to 20% by weight, preferably 0.3 to 15% by weight, and more preferably 0.5 to 10% by weight with respect to the total amount of the water base ink for ink-jet recording of the present invention.

When the pigment other than the self-dispersing type pigment is used as the coloring agent, it is necessary to disperse the pigment. The dispersing treatment is performed in accordance with the conventionally known method together with an appropriate dispersing agent, water, a water-soluble organic solvent, and optionally other additives. The dispersing agent is not specifically limited, which may include, for example, high molecular weight dispersing agents and surfactants. The high molecular weight dispersing agent is not specifically limited, which may include, for example, proteins such as gelatin and albumin; natural rubbers such as gum traganth; glucosides such as saponin; cellulose derivatives such as methyl cellulose, carboxy cellulose, and hydroxymethyl cellulose; natural high molecular weight compounds such as lignin sulfonic acid salt and shellac; anionic high molecular weight compounds such as polyacrylic acid salt, salt of styrene-acrylic acid copolymer, salt of vinylnaphthalene-acrylic acid copolymer, salt of styrene-maleic acid copolymer, salt of vinylnaphthalene-maleic acid copolymer, sodium salt of β-naphthalenesulfonic acid formalin condensate, and phosphoric acid salt; and nonionic high molecular weight compounds such as polyvinyl alcohol, polyvinyl pyrrolidone, and polyethylene glycol. The surfactant is not specifically limited, which may include, for example, anionic surfactants such as higher alcohol sulfate ester salt, liquid fatty oil sulfate ester salt, alkylarylsulfonic acid salt and alkylallylsulfonic acid salt; and nonionic surfactants such as polyoxyethylene alkyl ether, polyoxyethylene alkyl ester, sorbitan alkyl ester, and polyoxyethylene sorbitan alkyl ester. The dispersing agent as described above may be used singly. Alternatively, two or more of the dispersing agents as described above may be used in combination. The blending amount of the dispersing agent is preferably 0.01 to 20% by weight with respect to the total amount of the ink for ink-jet recording of the present invention.

The dispersing machine, which is used to disperse the pigment, is not specifically limited. It is possible to use any general dispersing machine including, for example, ball mill, roll mill, beads mill, and sand mill. In particular, it is preferable to use a high speed type beads mill.

The water-soluble organic solvent is principally used in order to avoid any drying-up of the ink and any occurrence of the deposition of solid matters from the ink due to the evaporation of water caused at the tip of the ink-jet head. It is preferable to use those which have low volatility and which have high dye solubility. The water-soluble organic solvent is not specifically limited, which may include, for example, polyvalent alcohols such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerol, 1,2,6-hexanetriol, 1,2,4-butanetriol, 1,2,3-butanetriol, and petriol; nitrogen-containing heterocyclic compounds such as N-methyl-2-pyrrolidone, N-hydroxyethyl-2-pyrrolidone, 2-pyrrolidone, 1,3-dimethylimidazolidinone, and E-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The water-soluble organic solvent as described above may be used singly. Alternatively, two or more of the water-soluble organic solvents as described above may be used in combination.

The blending amount of the water-soluble organic solvent is preferably 5 to 40% by weight with respect to the total amount of the ink for ink-jet recording of the present invention. If the blending amount is less than 5% by weight, the moistening action is insufficient. As a result, problems including, for example, the deposition of solid matters and the drying-up of the ink are sometimes caused when water contained in the ink is evaporated. If the blending amount exceeds 40% by weight, the viscosity of the ink is unnecessarily increased. As a result, problems are sometimes caused such that the discharge operation cannot be performed and/or the ink is dried extremely slowly on the recording medium.

The blending amount is more preferably 7 to 40% by weight and much more preferably 10 to 30% by weight.

The permeating agent is used in order to control the permeability of the ink for ink-jet recording of the present invention. The permeating agent may include, for example, polyvalent alcohol alkyl ether. The polyvalent alcohol alkyl ether is not specifically limited, which may include, for example, diethylene glycol monomethyl ether, diethylene glycol monobutyl ether, diethylene glycol monoisobutyl ether, diethylene glycol dimethyl ether, diethylene glycol diethyl ether, diethylene glycol dibutyl ether, dipropylene glycol monomethyl ether, dipropylene glycol monopropyl ether, dipropylene glycol monoisopropyl ether, dipropylene glycol monobutyl ether, dipropylene glycol dimethyl ether, dipropylene glycol dipropyl ether, dipropylene glycol dibutyl ether, triethylene glycol monomethyl ether, triethylene glycol monobutyl ether, tripropylene glycol monomethyl ether, tripropylene glycol monobutyl ether, triethylene glycol dimethyl ether, triethylene glycol dibutyl ether, tripropylene glycol dimethyl ether, and tripropylene glycol dibutyl ether. The content of the permeating agent is preferably 0.05 to 15% by weight with respect to the total amount of the ink for ink-jet recording of the present invention.

The ink for ink-jet recording of the present invention may contain monovalent alcohol such as ethanol and isopropyl alcohol in order to control the drying performance and the permeating performance into the recording medium.

The water base ink for ink-jet recording of the present invention is basically constructed as described above. However, if necessary, the water base ink for ink-jet recording of the present invention may be blended, for example, with known pH-adjusting agents, dye-dissolving agents, antiseptic/fungicidal agents, and rustproofing agents. When the water base ink for ink-jet recording of the present invention is applied to the ink-jet recording method in which the recording liquid is charged, it is possible to blend specific resistance-adjusting agents such as inorganic salts including, for example, lithium chloride, ammonium chloride, and sodium chloride. When the water base ink for ink-jet recording of the present invention is applied to the ink-jet recording system in which the ink is discharged in accordance with the action of thermal energy, thermal physical values including, for example, the specific heat, the coefficient of thermal expansion, and coefficient of thermal conductivity may be adjusted.

The ink-jet recording apparatus, to which the water base ink for ink-jet recording of the present invention is applied, is not specifically limited. However, those preferably usable include, for example, an apparatus as shown in FIG. 1 which has a recording head for discharging the ink onto the recording medium to perform the recording, and a restoring unit. The restoring unit comprises a suction cap which makes contact with a nozzle surface of the recording head so that the suction cap is capable of making approach and separation with respect to the nozzle surface of the recording head, a suction pump which is capable of sucking the ink contained in the recording head by the aid of the suction cap, and a control means which drives and controls the suction pump. The suction pressure of the suction pump is preferably not less than −90 kPa and not more than −20 kPa. If the suction pressure is a negative pressure weaker than −20 kPa, no sufficient purge restoration performance can be obtained in some cases, because it is impossible to sufficiently discharge the ink and the bubbles. If the suction pressure is a negative pressure stronger than −90 kPa, no sufficient purge restoration performance can be obtained in some cases, because the flow rate of the ink to be discharged is excessively increased, the amount of the bubbles generated from the dissolved gas in the ink is increased, and the volatile components contained in the ink tend to be vaporized to form the bubbles. The suction pressure is more preferably not less than −70 kPa and not more than −40 kPa.

Figure 4:
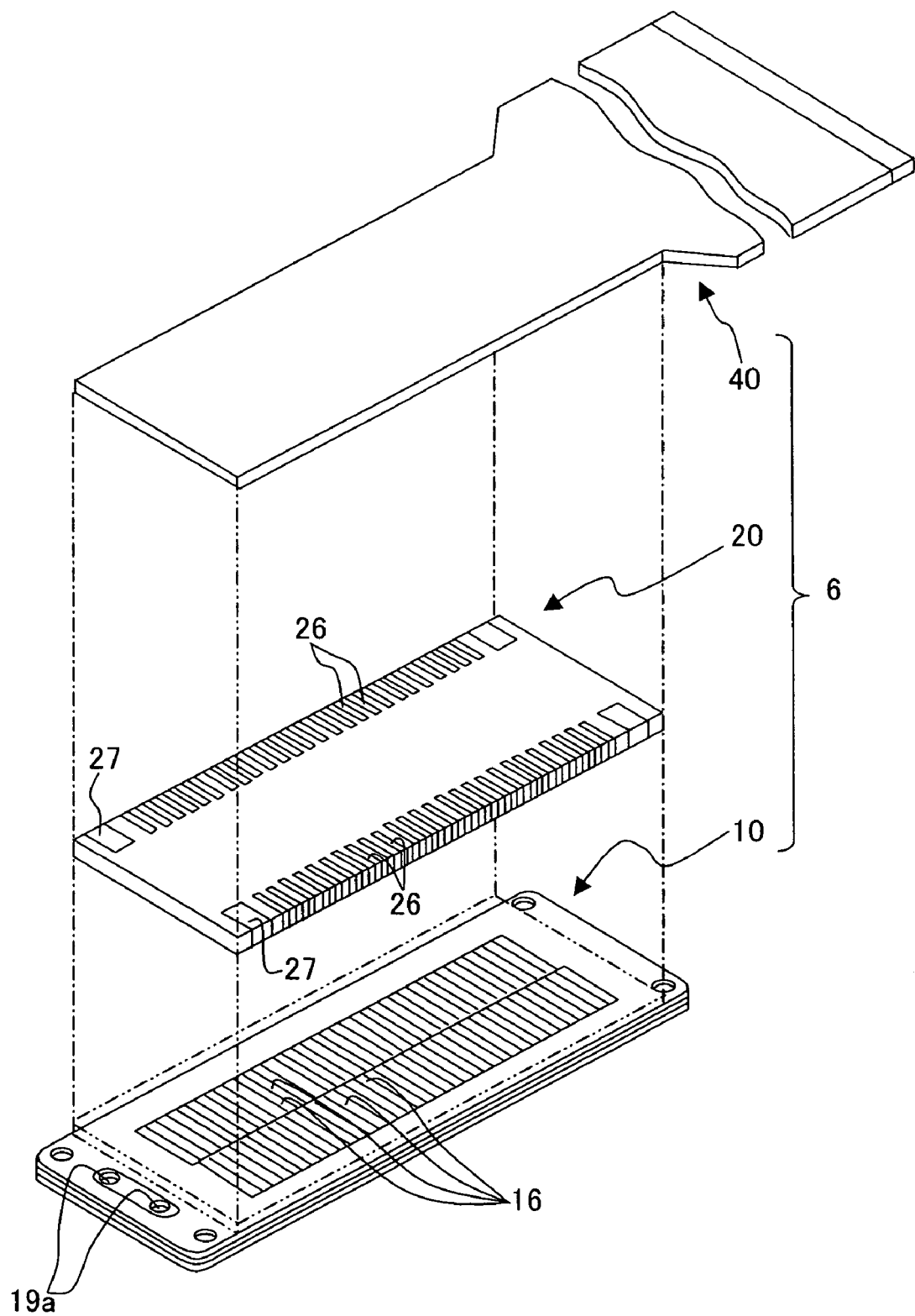
FIG. 4 shows an exploded perspective view illustrating a piezoelectric ink-jet head 6.
Figure 5:
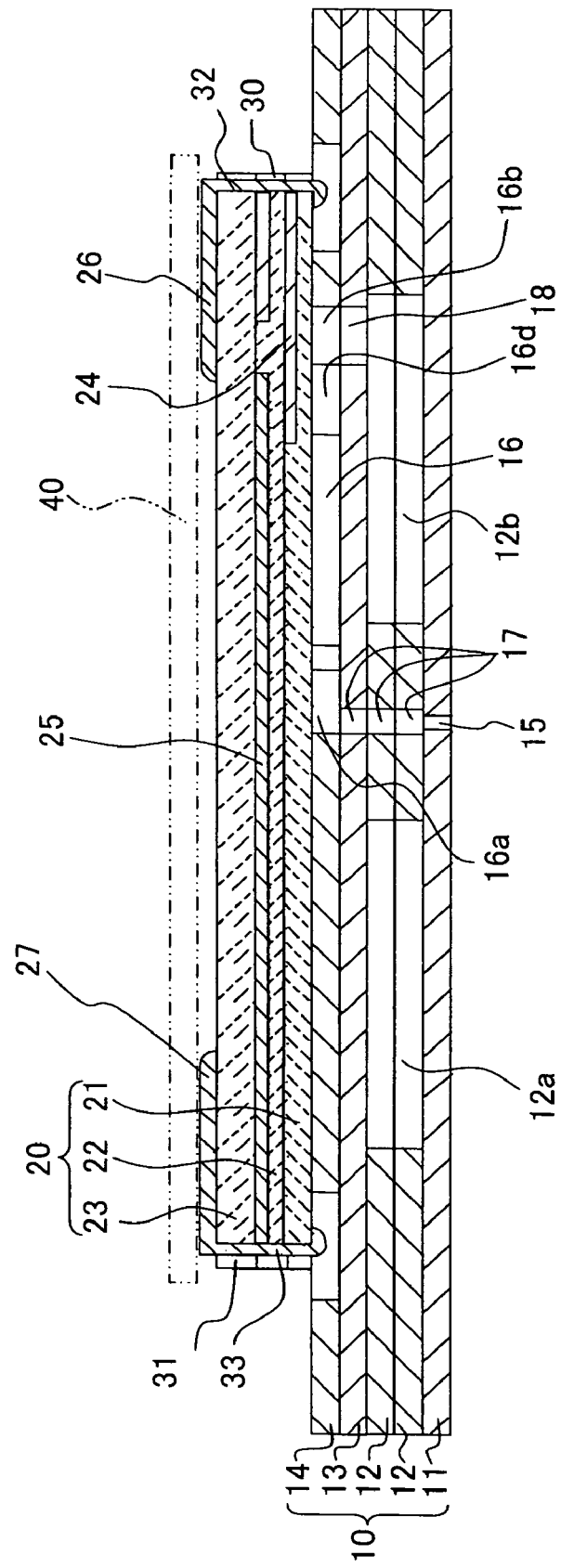
FIG. 5 shows a side sectional view illustrating the piezoelectric ink-jet head 6.
Figure 6:
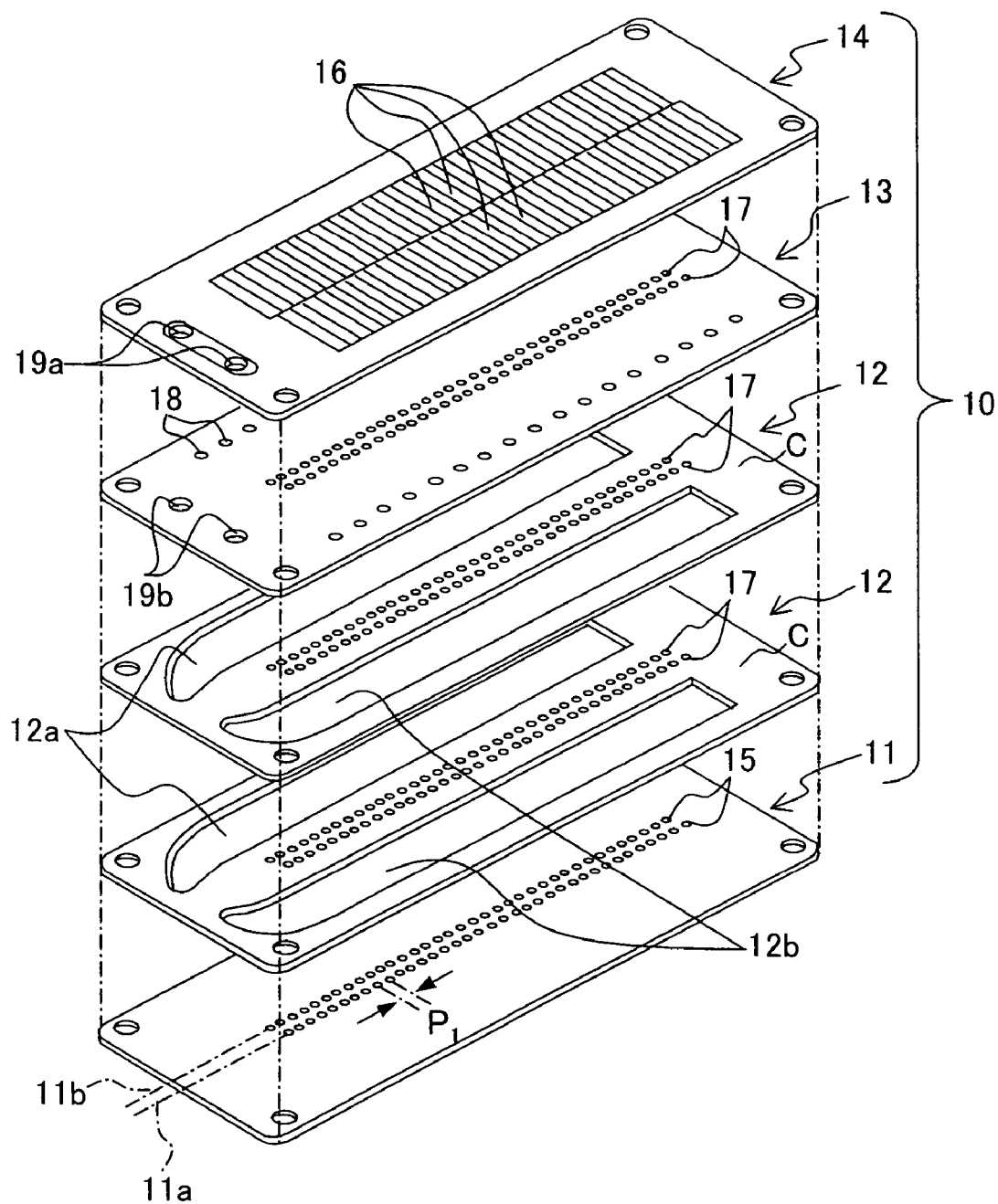
FIG. 6 shows an exploded perspective view illustrating a cavity plate 10.
Figure 7:
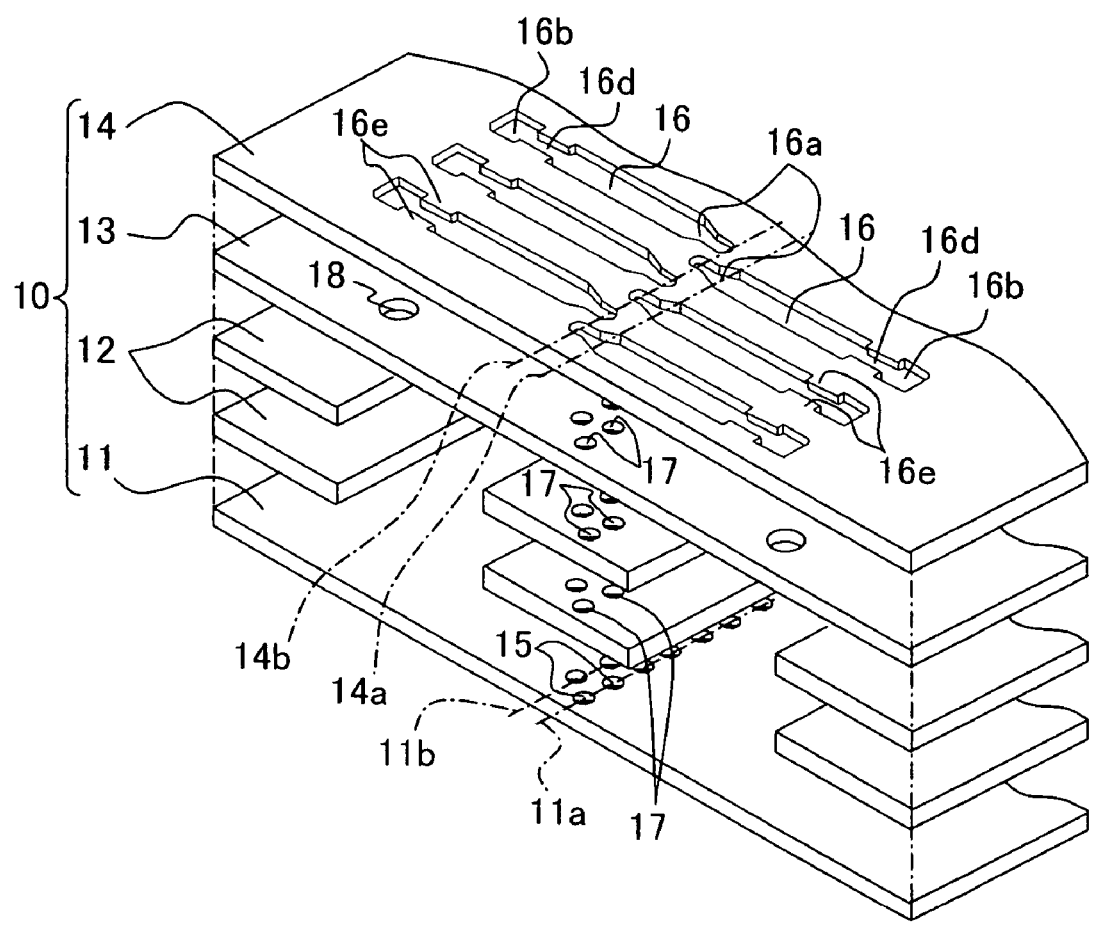
FIG. 7 shows an exploded perspective view illustrating magnified main components of the cavity plate 10.
Figure 8:
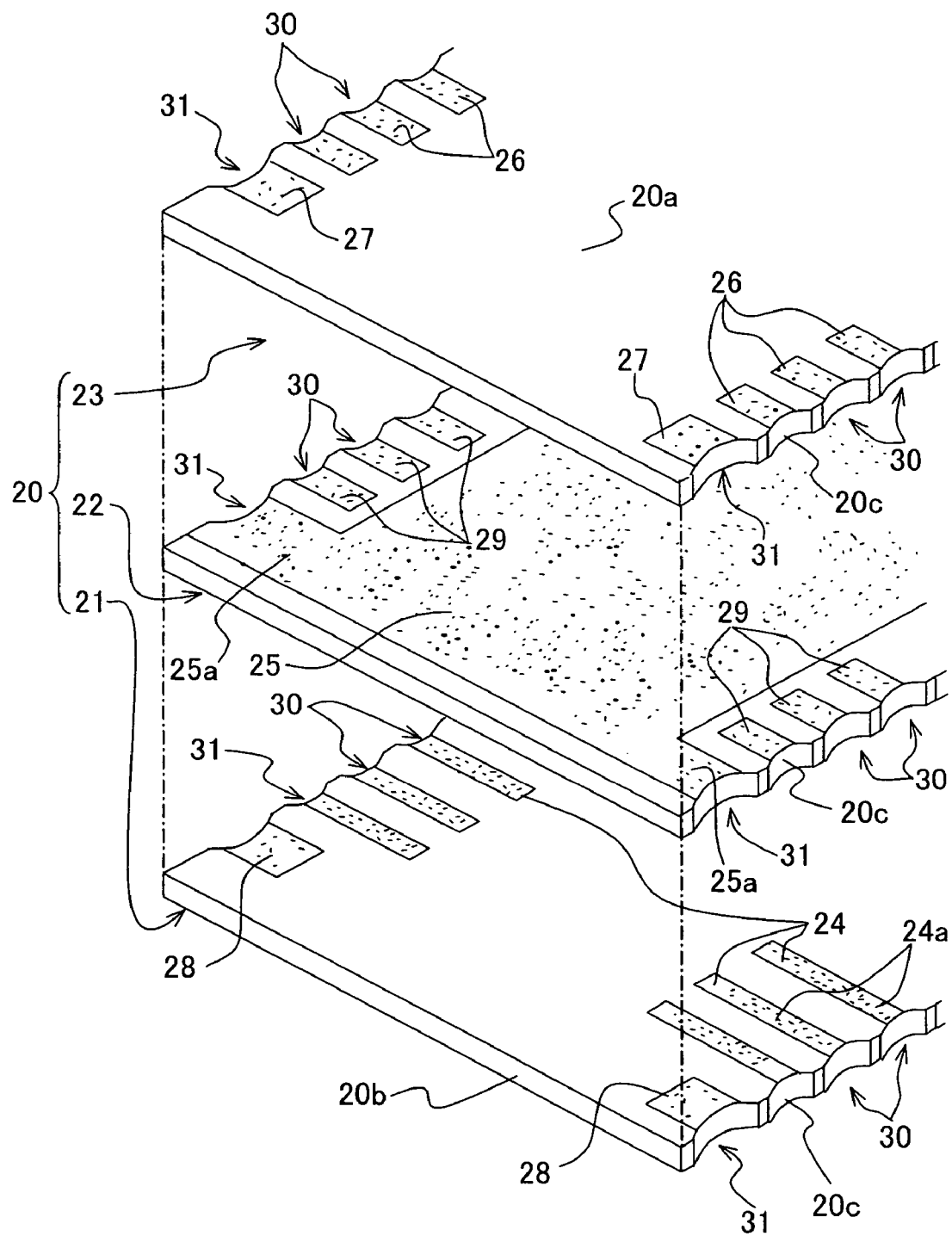
FIG. 8 shows an exploded perspective view illustrating magnified main components of a piezoelectric actuator 20.

Next, the structure of the piezoelectric ink-jet head 6 will be explained with reference to FIGS. 4 to 8. FIG. 4 shows an exploded perspective view illustrating the piezoelectric ink-jet head 6. FIG. 5 shows a side sectional view illustrating the piezoelectric ink-jet head 6. FIG. 6 shows an exploded perspective view illustrating a cavity plate 10. FIG. 7 shows an exploded perspective view illustrating magnified main components of the cavity plate 10. FIG. 8 shows an exploded perspective view illustrating magnified main components of a piezoelectric actuator 20.

As shown in FIGS. 4 and 5, the piezoelectric ink-jet head 6 is constructed by laminating and joining, with an adhesive, the stacked type cavity plate 10 which is composed of a plurality of sheets, the plate type piezoelectric actuator 20 which is adhered and stacked onto the cavity plate 10 by the aid of the adhesive or an adhesive sheet, and the flexible flat cable 40 which is disposed on the upper surface of the piezoelectric actuator 20 in order to effect electric connection to an external apparatus. The ink is jetted downwardly from the nozzles 15 which are open on the lower surface side of the cavity plate 10 disposed at the lowermost layer.

On the other hand, as shown in FIG. 6, the cavity plate (cavity unit) 10 has such a structure that five thin metal plates, i.e., a nozzle plate 11, two manifold plates 12, a spacer plate 13, and a base plate 14 are superimposed and stacked with an adhesive composed of epoxy resin respectively. In the embodiment of the present invention, each of the plates 11 to 14 is made of 42% nickel alloy steel plate (42 alloy) having a thickness of about 50 µm to 150 µm. Each of the plates 11 to 14 may be formed of, for example, a resin without being limited to the metal.

As shown in FIG. 7, a plurality of pressure chambers 16, each of which has a thin width and which extend in a direction perpendicular to center lines 14a, 14b in the longitudinal direction, are bored through the base plate 14 in two arrays of zigzag arrangement. Ink supply holes 16b are bored at positions located outwardly from the respective pressure chambers 16 toward the both ends of the base plate 14 in the transverse direction of the base plate 14 respectively corresponding to the respective pressure chambers 16. The respective pressure chambers 16 and the respective ink supply holes 16b are connected to one another by throttle sections 16d which are formed therebetween. The respective ink supply holes 16b are communicated with common ink chambers 12a, 12b of the manifold plates 12 via respective ink supply holes 18 which are bored through left and right portions on the both sides in the transverse direction of the spacer plate 13. In this embodiment, as shown in FIG. 7, the throttle section 16d is formed such that the spacing distance between left and right walls (walls for constituting connecting sections 16e as described later on) of the base plate 14 for constituting the throttle section is smaller than the spacing distances between left and right walls for constituting the pressure chamber 16 and the ink supply hole 16b, for the following reason. That is, it is intended to increase the flow passage resistance to the counterflow toward the ink supply hole 16b during the ink-jetting operation as described later on by decreasing the cross-sectional area of the throttle section 16d in the direction perpendicular to the direction of the flow of the ink. First ends 16a of the respective pressure chambers 16 are communicated with the nozzles 15 disposed in the zigzag arrangement in the nozzle plate 11, via through-holes 17 each having a minute diameter bored in the zigzag arrangement as well through the spacer plate 13 and the two manifold plates 12.

As shown in FIG. 6, the ink supply holes 19a, 19b, which are provided to supply the inks from the ink cartridges 61 to the common ink chambers 12a, 12b of the manifold plates 12, are bored through the base plate 14 and the spacer plate 13 respectively. The two manifold plates 12 are provided with the two common ink chambers 12a, 12b which extend in the longitudinal direction while interposing the arrays of the plurality of nozzles 15 of the nozzle plate 11. The common ink chambers 12a, 12b are formed as openings which penetrate through the respective manifold plates 12. One common ink chamber is formed by the openings which are superimposed in the vertical direction. One common ink chamber 12a is communicated with the pressure chambers 16 disposed in one array, and the other common ink chamber 12b is communicated with the pressure chambers 16 disposed in the other array. The respective common ink chambers 12a, 12b are positioned in the plane parallel to the plane formed by the plurality of pressure chambers 16 of the base plate 14. Further, the respective common ink chambers 12a, 12b are formed to extend by longer distances in the direction of the arrays formed by the plurality of pressure chambers 16 on the side of the nozzle plate 11 as compared with the plurality of pressure chambers 16.

The common ink chambers 12a, 12b are structured such that they are tightly closed by stacking the nozzle plate 11 and the spacer plate 13 on the two manifold plates 12. The certain portion of the spacer plate 13, which forms the bottom of each of the pressure chambers 16, forms the upper surface of each of the common ink chambers 12a, 12b. The certain portion of the spacer plate 13 is bendable toward each of the common ink chambers 12a, 12b owing to the resilience.

The plurality of nozzles 15 for jetting the inks, each of which has a minute diameter (about 25 μm in this embodiment), are bored through the nozzle plate 11 in the zigzag arrangement at spacing distances of minute pitches $P_1$ along center lines 11a, 11b in the longitudinal direction of the nozzle plate 11. The respective nozzles 15 correspond to respective through-holes 17 bored through the manifold plates 12.

The cavity plate 10 is constructed as described above. Accordingly, the ink, which inflows into each of the common ink chambers 12a, 12b from the ink cartridge (102) via each of the ink supply holes 19a, 19b bored at the first ends of the base plate 14 and the spacer plate 13, passes from each of the common ink chambers 12a, 12b through the respective ink supply holes 18, the respective ink supply holes 16b, and the throttle sections 16d, and the ink is distributed to the respective pressure chambers 16. The ink flows in the direction toward the first ends 16a of the respective pressure chambers 16. The ink passes through the respective through-holes 17, and it arrives at the nozzles 15 corresponding to the respective pressure chambers 16. The flow passage from the ink supply holes 19a, 19b to the nozzles 15 constitutes an ink flow passage. The epoxy resin adhesive is exposed to the wall surface of the ink flow passages except nozzles 15 and the central portion of the manifold.

On the other hand, as shown in FIG. 8, the piezoelectric actuator 20 is structured such that two piezoelectric sheets 21, 22 and one insulating sheet 23 are stacked. A plurality of driving electrodes 24, each of which has a thin width and which correspond to the respective pressure chamber 16 of the cavity plate 10 one by one, are provided in the zigzag arrangement on the upper surface of the piezoelectric sheet 21 disposed at the lowermost level. First ends 24a of the respective driving electrodes 24 are formed to be exposed to left and right side surfaces 20c which are perpendicular to front and back surfaces 20a, 20b of the piezoelectric actuator 20.

A common electrode 25, which is common to the plurality of pressure chambers 16, is provided on the upper surface of the piezoelectric sheet 22 disposed at the next level.

Surface electrodes 26 corresponding to the respective driving electrodes 24 one by one and surface electrodes 27 corresponding to the common electrode 25 are provided on the upper surface of the insulating sheet 23 disposed at the uppermost level so that the surface electrodes 26, 27 are aligned along the left and right side surfaces 20c. First recessed grooves 30 are provided for the first ends 24a of the respective driving electrodes 24 and second recesses grooves 31 are provided for the first ends 25a of the common electrode 25 so that the first and second recessed grooves 30, 31 extend in the stacking direction on the left and right side surfaces 20c respectively. As shown in FIG. 5, a side surface electrode 32, which electrically connects each of the driving electrodes 24 and each of the surface electrodes 26, is formed in each of the first recessed grooves 30. Further, a side surface electrode 33, which electrically connects the common electrode 25 and each of the surface electrodes 27, is formed in each of the second recessed grooves 31. Electrodes designated by reference numerals 28 and 29 are electrodes of extra patterns.

Figure 2:
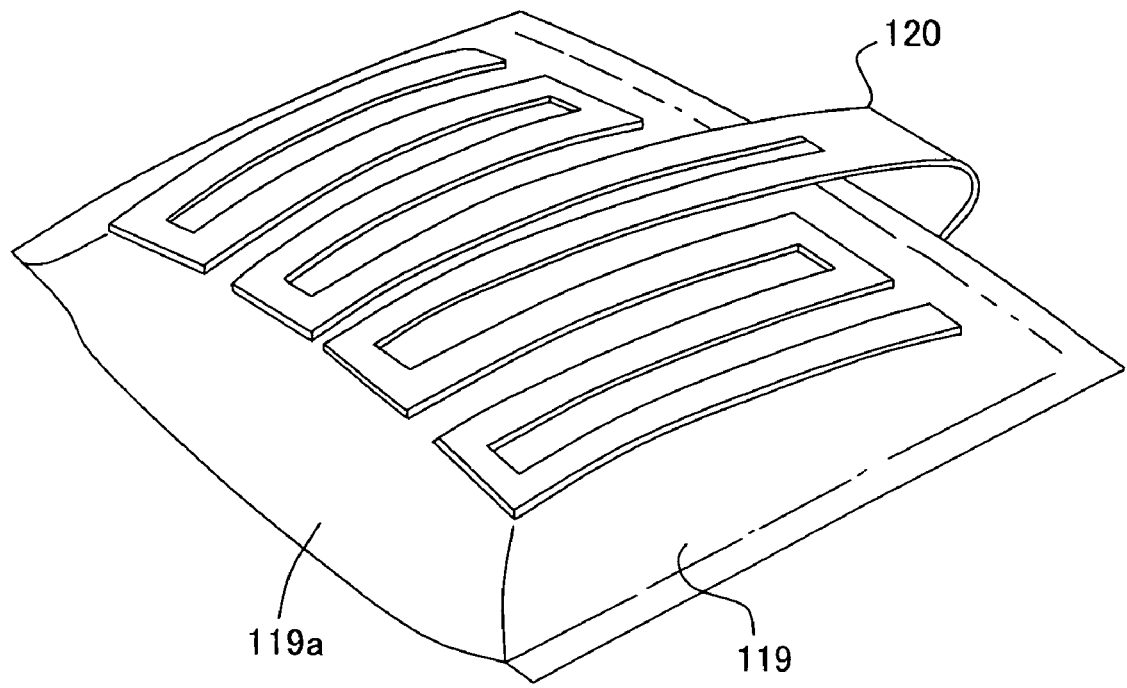
FIG. 2 shows a perspective view illustrating an ink cartridge.

The water base ink for ink-jet recording of the present invention is preferably applied to the ink-jet printer as described above in a state in which the ink is accommodated in an ink cartridge which is capable of shutting out or shutting off oxygen. For example, a container made of a flexible film such as a bag 119 shown in FIG. 2, which is disclosed, for example, in Japanese Patent Application Laid-open Nos. 11-58760 and 11-99660, is preferably used as the ink cartridge. The flexible film to be used is obtained by laminating a plurality of layers of, for example, metal foils such as aluminum, polyethylene, polypropylene, and nylon in combination. The flexible film has the property to shut out oxygen. The bag 119 is accommodated in a rigid box as disclosed in the documents described above, and the bag 119 is connected to the recording head of the ink-jet recording apparatus as shown in FIG. 1. In the case of the bag 119, an end surface 119a of the bag is pierced with a needle-shaped supply tube provided on the side of the recording head to supply the ink contained in the bag 119 to the recording head. However, an opening of the bag may be sealed with a rubber plug in the same manner as in other known structures, and the rubber plug may be pierced with a needle-shaped supply tube. The bag 119 is urged by a spring 120 in a direction to expand the internal volume to apply the back pressure to the ink which is supplied to the recording head. However, when the back pressure is applied to the ink by any other means in the same manner as in other known structures, the spring 120 can be omitted. The container made of the resin film, which has the property to shut out oxygen, is contracted by the amount corresponding to the amount of consumption of the ink. Therefore, the atmospheric air is not introduced into the inside. It is possible to avoid the increase of the amount of dissolved oxygen contained therein which would be otherwise caused by the absorption of oxygen in the atmospheric air. Further, it is possible to maintain the deoxidization state. The ink cartridge may be detachably attached to the main recording apparatus body, and the cartridge and the recording head may be communicated with each other via an ink supply tube. Alternatively, the ink cartridge may be of the type in which the ink cartridge is detachably installed to the recording head.

With the water base ink for ink-jet recording of the present invention, the high recording quality, which is based on the sharp image area edge, can be secured owing to the fact that the surface tension is not less than 40 mN/m. Further, it is possible to lower the adhesive force with respect to the wall surface of the ink flow passage, of the bubbles generated when the ink is subjected to the pressure reduction, for example, when the purge operation or the like is performed, and it is possible to obtain the satisfactory purge restoration performance owing to the fact that the amount of dissolved oxygen is decreased to be not more than 4 mg/L.

EXAMPLES

The present invention will be explained in more detail below as exemplified by Examples. However, the present invention is not limited to only Examples.

Method for Preparing Water Base Ink for Ink-jet Recording

Example 1

CAB-O-JET 300 Black (produced by Cabot, pigment content: 15% by weight): 33.0% by weight:
Glycerol: 26.0% by weight;
Diethylene glycol diethyl ether: 1.0% by weight;
Nonionic surfactant (produced by Lion Corporation, ETHOMEEN C/15): 0.2% by weight;
Pure water: balance.

The respective materials described above were sufficiently agitated and mixed with each other, followed by being filtrated through a membrane filter of 2.5 µm. 100 ml of an obtained water base ink for ink-jet recording was poured into an eggplant-shaped flask having a volume of 200 ml. Deoxidation was performed by means of the vacuum thin film deoxidation method under a condition in which the temperature was 25° C., the number of revolutions was 150 rpm, the pressure was 30 hPa, and the time was 15 minutes by using a rotary evaporator apparatus (produced by Yamato Scientific Co., Ltd., Rotary Evaporator RE 540, Vacuum Controller VR 100, Water Bath BM 400) and an aspirator for the pressure reduction. As for the water base ink for ink-jet recording, the surface tension was 55 mN/m, and the amount of dissolved oxygen was 1.8 mg/L.

Example 2

A water base ink for ink-jet recording, which was obtained in the same manner as in Example 1, was left to stand in the atmospheric air after the deoxidation operation to slightly increase the amount of dissolved oxygen. As for the water base ink for ink-jet recording, the surface tension was 55 mN/m, and the amount of dissolved oxygen was 2.7 mg/L.

Example 3

A water base ink for ink-jet recording, which was obtained in the same manner as in Example 2, was further left to stand in the atmospheric air to increase the amount of dissolved oxygen. As for the water base ink for ink-jet recording, the surface tension was 55 mN/m, and the amount of dissolved oxygen was 3.8 mg/L.

Example 4

CAB-O-JET 300 Black (produced by Cabot, pigment content: 15% by weight): 33.0% by weight:
Glycerol: 26.0% by weight;
Diethylene glycol diethyl ether: 1.0% by weight;
Nonionic surfactant (produced by Lion Corporation, ETHOMEEN C/15): 0.25% by weight;
Pure water: balance.

The respective materials described above were sufficiently agitated and mixed with each other, followed by being filtrated through a membrane filter of 2.5 µm. Subsequently, the deoxidation was performed by means of the vacuum thin film deoxidation method in the same manner as in Example 1. As for the water base ink for ink-jet recording, the surface tension was 46 mN/m, and the amount of dissolved oxygen was 2.0 mg/L.

Example 5

A water base ink for ink-jet recording, which was obtained in the same manner as in Example 4, was left to stand in the atmospheric air after the deoxidation operation to slightly increase the amount of dissolved oxygen. As for the water base ink for ink-jet recording, the surface tension was 46 mN/m, and the amount of dissolved oxygen was 3.9 mg/L.

Example 6

A water base ink for ink-jet recording, which was obtained in the same manner as in Example 4, was subjected to a deoxidation operation which was performed by means of a method for effecting the substitution with oxygen contained in the ink by bubbling nitrogen gas in the ink. When the bubbling of nitrogen gas was started, the amount of dissolved oxygen in the ink began to decrease. The substitution was stopped when the amount of dissolved oxygen was not more than 4 mg/L. As for the water base ink for ink-jet recording, the surface tension was 46 mN/m, and the amount of dissolved oxygen was 3.5 mg/L.

Example 7

The water base ink for ink-jet recording prepared in Example 1 was accommodated in an ink cartridge having the property to shut out oxygen. The ink cartridge was installed to a recording head of an ink-jet recording apparatus, followed by being left to stand for 2 months. As for the water base ink for ink-jet recording, the surface tension was 55 mN/m, and the amount of dissolved oxygen was 3.2 mg/L. The amount of dissolved oxygen was measured for the ink which remained in the ink cartridge after carrying out the evaluation.

Comparative Example 1

A water base ink for ink-jet recording, which was obtained in the same manner as in Example 5, was further left to stand in the atmospheric air to further increase the amount of dissolved oxygen. As for the water base ink for ink-jet recording, the surface tension was 46 mN/m, and the amount of dissolved oxygen was 4.2 mg/L.

Comparative Example 2

A water base ink for ink-jet recording, which was obtained in the same manner as in Comparative Example 1, was further left to stand in the atmospheric air to further increase the amount of dissolved oxygen. As for the water base ink for ink-jet recording, the surface tension was 46 mN/m, and the amount of dissolved oxygen was 4.7 mg/L.

Comparative Example 3

A water base ink for ink-jet recording, which was obtained in the same manner as in Comparative Example 2, was further left to stand in the atmospheric air to further increase the amount of dissolved oxygen. As for the water base ink for ink-jet recording, the surface tension was 46 mN/m, and the amount of dissolved oxygen was 5.5 mg/L.

Comparative Example 4

CAB-O-JET 300 Black (produced by Cabot, pigment content: 15% by weight): 33.0% by weight:
Glycerol: 26.0% by weight;
Diethylene glycol diethyl ether: 1.0% by weight;
ETHOMEEN C/15 (produced by Lion Corporation, nonionic surfactant): 0.5% by weight;
Pure water: balance.

The respective materials described above were sufficiently agitated and mixed with each other, followed by being filtrated through a membrane filter of 2.5 μm. Subsequently, the deoxidation was performed by means of the vacuum thin film deoxidation method in the same manner as in Example 1. As for the water base ink for ink-jet recording, the surface tension was 33 mN/m, and the amount of dissolved oxygen was 1.9 mg/L.

Comparative Example 5

A water base ink for ink-jet recording, which was obtained in the same manner as in Comparative Example 4, was left to stand in the atmospheric air after the deoxidation operation to increase the amount of dissolved oxygen. As for the water base ink for ink-jet recording, the surface tension was 33 mN/m, and the amount of dissolved oxygen was 5.5 mg/L.

Comparative Example 6

The water base ink for ink-jet recording prepared in Example 1 was accommodated in an ink cartridge having the property to shut out oxygen. The ink cartridge was pierced or holed. The ink cartridge was installed to a recording head of an ink-jet recording apparatus in a state in which the ink contained in the ink cartridge was brought into contact with the atmospheric air, followed by being left to stand for 2 months. As for the water base ink for ink-jet recording, the surface tension was 55 mN/m, and the amount of dissolved oxygen was 5.5 mg/L. The amount of dissolved oxygen was measured for the ink which remained in the ink cartridge after carrying out the evaluation.

Evaluation

The purge restoration performance and the image area edges were evaluated for the inks for ink-jet recording prepared in Examples 1 to 7 and Comparative Examples 1 to 6. At first, an empty ink cartridge, which was made of a resin film having the property to shut out oxygen, was filled with the ink. The ink cartridge filled with the ink was attached to a recording head of an ink-jet recording apparatus (MFC-3100C, produced by Brother Industries, Ltd.) having a restoring unit with a suction pressure of −50 kPa. When the operation for attaching the ink cartridge was completed, the initial purge operation was automatically performed in order to introduce the ink contained in the ink cartridge into the recording head. Subsequently, the ink was discharged from ink-jet nozzles to evaluate the purge restoration performance. When the purge restoration performance was evaluated, the purge operation and the recording operation were manually repeated five times in total to make the evaluation in accordance with the following evaluation criteria.

OK: the number of discharge failure nozzles was zero within the five times purge operations.

NG: the number of discharge failure nozzles was not zero within the five times purge operations.

The image area edge was evaluated visually in accordance with the following evaluation criteria. XEROX 4200 paper (produced by Xerox) was used for the recording paper.

OK: the image area edge was sharp, and the recorded matter was vivid.

NG: the image area edge was collapsed due to the occurrence of blurring, and the recorded matter was not vivid.

The overall evaluation was made for the purge restoration performance and the image area edge in accordance with the following evaluation criteria.

OK: the purge restoration performance was excellent, and the image area edge was sharp.

NG: any one of the purge restoration performance and the image area edge was insufficient.

Table 1 shows results of the evaluation of the purge restoration performance, the evaluation of the image area edge, and the overall evaluation. The amount of dissolved oxygen and the ratio of the number of discharge failure nozzles are shown in Table 2 for Examples 4 and 5 and Comparative Examples 1 to 3, which are shown as a graph in FIG. 3. The inks of Examples 4 and 5 and Comparative Examples 1 to 3 have the same composition, in which only the amount of dissolved oxygen differs. The ratio of the number of discharge failure nozzles is the ratio of the total number of discharge failure nozzles with respect to the total number of all nozzles in the recording operations performed five times in total.

TABLE 1

|  | Surface tension (mN/m) | Amount of dissolved oxygen (mg/L) | Purge restoration performance | Image area edge | Overall evaluation |
| --- | --- | --- | --- | --- | --- |
| Example 1 | 55 | 1.8 | OK | OK | OK |
| Example 2 | 55 | 2.7 | OK | OK | OK |
| Example 3 | 55 | 3.8 | OK | OK | OK |
| Example 4 | 46 | 2.0 | OK | OK | OK |
| Example 5 | 46 | 3.9 | OK | OK | OK |
| Example 6 | 46 | 3.5 | OK | OK | OK |
| Example 7 | 55 | 2.3 | OK | OK | OK |
| Comp. Ex. 1 | 46 | 4.2 | NG | OK | NG |
| Comp. Ex. 2 | 46 | 4.7 | NG | OK | NG |
| Comp. Ex. 3 | 46 | 5.5 | NG | OK | NG |
| Comp. Ex. 4 | 33 | 1.9 | OK | NG | NG |
| Comp. Ex. 5 | 33 | 5.5 | NG | NG | NG |
| Comp. Ex. 6 | 55 | 5.5 | NG | OK | NG |

TABLE 2

|  | Amount of dissolved oxygen (mg/L) | Ratio of number of discharge failure nozzles (%) |
| --- | --- | --- |
| Example 4 | 2.0 | 0.5 |
| Example 5 | 3.9 | 1.0 |
| Comp. Ex. 1 | 4.2 | 6.1 |
| Comp. Ex. 2 | 4.7 | 6.3 |
| Comp. Ex. 3 | 5.5 | 55.4 |

According to Table 1, the inks for ink-jet recording prepared in Examples 1 to 7 satisfied both of the sharp image area edge and the satisfactory purge restoration performance. In Example 6, the amount of dissolved oxygen was decreased by exchanging oxygen with nitrogen without changing the amount of dissolved gas in the ink. As a result, both of the sharp image area edge and the satisfactory purge restoration performance were satisfied in the same manner as in Examples 1 to 5. This shows the fact that the purge restoration performance is affected by the amount of dissolved oxygen not by the amount of dissolved gas in the ink. In Example 7, the storage performance was confirmed for the ink for ink-jet recording in the ink cartridge. It is indicated that when the ink contained in the ink cartridge is not contacted with the atmospheric air, then it is possible to suppress the increase of the amount of dissolved oxygen contained in the ink during the storage period, and it is possible to maintain the sharp image area edge and the satisfactory purge-restoration performance over a long period of time.

On the other hand, in the case of the inks for ink-jet recording prepared in Comparative Examples 1 to 3, the surface tension exceeded 40 mN/m, and the amount of dissolved oxygen exceeded 4 mg/L. As a result of the evaluation, although the image area edge was sharp, the purge restoration performance was unsatisfactory. Further, the discharge failure nozzles and the discharge unstable nozzles did not disappear. Therefore, for example, missing and twist occurred in the image area. In the ink for ink-jet recording prepared in Comparative Example 4, the amount of dissolved oxygen was not more than 4 mg/L, and the surface tension was not more than 40 mN/m. As a result of the evaluation, the image area edge was blurred, and the recording quality was unsatisfactory, although the purge restoration performance was excellent. In the ink for ink-jet recording prepared in Comparative Example 5, the surface tension was not more than 40 mN/m. As a result of the evaluation, the image area edge was blurred, and the recording quality was unsatisfactory. In Comparative Example 6, the storage performance was confirmed for the ink for ink-jet recording in the ink cartridge. Due to the hole formed to make the contact between the atmospheric air and the ink contained in the ink cartridge, the amount of dissolved oxygen was increased during the storage period. As a result of the evaluation, the purge restoration performance was deteriorated, and it was impossible to maintain any satisfactory purge restoration performance over a long period of time.

Figure 3:
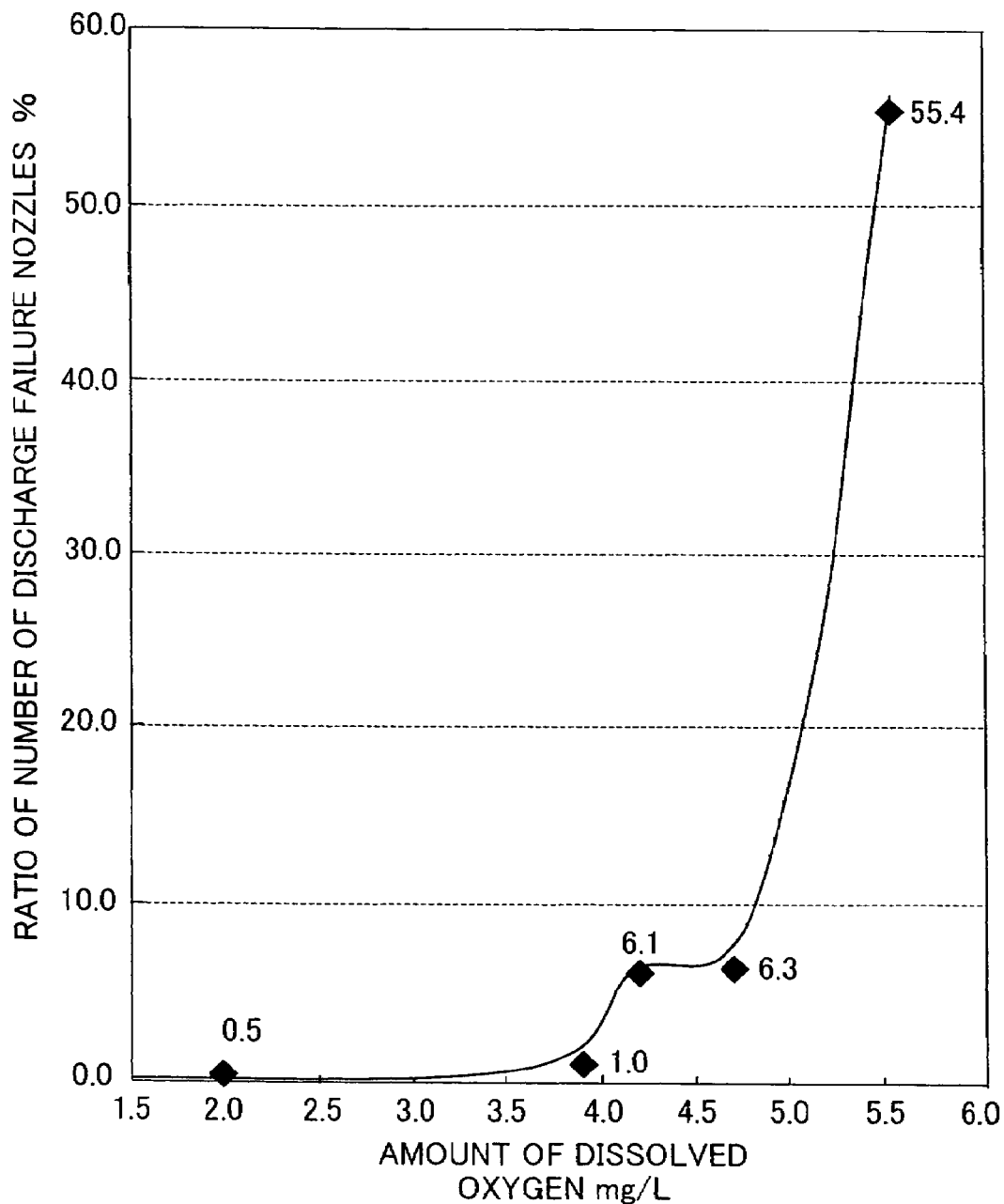
FIG. 3 shows a relationship between the amount of dissolved oxygen contained in the ink and the purge restoration performance.

According to Table 2 and FIG. 3, the following fact is appreciated. That is, the ratio of the number of discharge failure nozzles is extremely low in the area in which the amount of dissolved oxygen is not more than 4 mg/L. When the amount of dissolved oxygen exceeds 4 mg/L, the ratio of the number of discharge failure nozzles suddenly increases.

According to the present invention, it is possible to provide the water base ink for ink-jet recording which has the satisfactory purge restoration performance while securing the high recording quality with the sharp image area edge.

What is claimed is:

1. An ink-jet recording apparatus comprising:
a recording head which discharges an ink onto a recording medium to perform recording and which is formed by stacking a plurality of thin metal plates with an adhesive;
a restoring unit which includes a suction cap for detachably covering a nozzle surface of the recording head, and a suction pump for sucking the ink contained in the recording head through the suction cap; and
an ink container which accommodates the ink to be supplied to the recording head,
wherein a surface tension of the ink is not less than 40 mN/m, and an amount of dissolved oxygen contained in the ink is not more than 4 mg/L;
wherein an ink flow passage, which is communicated with a nozzle of the nozzle surface, is formed in the recording head, and the adhesive is exposed to a wall surface of the ink flow passage; and
wherein wettability between the ink and the adhesive is lower than wettability between the ink and the thin metal plates.

2. The ink-jet recording apparatus according to claim 1, wherein the adhesive is an epoxy resin.

3. The ink-jet recording apparatus according to claim 1, wherein the amount of dissolved oxygen contained in the ink is not more than 2.5 mg/b.

4. The ink-jet recording apparatus according to claim 1, wherein the ink container is a replaceable ink cartridge.

\* \* \* \* \*